United States Patent
Kazerouni

(10) Patent No.: US 9,833,108 B2
(45) Date of Patent: Dec. 5, 2017

(54) BARBECUE GRILL WITH ROTATING FIRE RECEPTACLE

(71) Applicant: Bijan M. Kazerouni, Potomac, MD (US)

(72) Inventor: Bijan M. Kazerouni, Potomac, MD (US)

( * ) Notice: Subject to any disclaimer, the term of this patent is extended or adjusted under 35 U.S.C. 154(b) by 280 days.

(21) Appl. No.: 14/789,986

(22) Filed: Jul. 1, 2015

(65) Prior Publication Data

US 2015/0297028 A1   Oct. 22, 2015

Related U.S. Application Data

(63) Continuation-in-part of application No. 13/924,850, filed on Jun. 24, 2013, now abandoned.

(60) Provisional application No. 61/663,564, filed on Jun. 23, 2012.

(51) Int. Cl.
*A47J 37/07*     (2006.01)
*A47J 37/04*     (2006.01)

(52) U.S. Cl.
CPC ......... *A47J 37/043* (2013.01); *A47J 37/0786* (2013.01); *A47J 2037/0795* (2013.01)

(58) Field of Classification Search
CPC ........................................ A47J 37/07–37/0731
USPC ................... 99/339–440; 126/25 R–25 C, 30
See application file for complete search history.

(56) References Cited

U.S. PATENT DOCUMENTS

| | | | |
|---|---|---|---|
| 3,261,344 A * | 7/1966 | Petrie | A47J 37/0763 126/30 |
| 3,322,061 A | 5/1967 | Frazier | |
| 3,323,508 A | 6/1967 | Holman | |
| 3,814,076 A | 6/1974 | Zankowsky et al. | |
| 3,946,653 A | 3/1976 | Pugh | |
| 4,347,830 A * | 9/1982 | Runyan | B60N 3/16 108/134 |
| 4,607,608 A * | 8/1986 | Allred | A47J 33/00 126/25 A |
| 4,612,851 A * | 9/1986 | McManus | A47J 33/00 126/30 |
| 4,724,753 A | 2/1988 | Neyman et al. | |
| 5,666,940 A * | 9/1997 | Kreiter | A47J 33/00 126/25 A |
| 5,893,357 A * | 4/1999 | Royer | A47J 37/0713 126/25 R |
| 5,931,148 A * | 8/1999 | Freeman | A47J 37/0704 126/25 A |

(Continued)

*Primary Examiner* — Michael LaFlame, Jr.
(74) *Attorney, Agent, or Firm* — Richard C. Litman

(57) ABSTRACT

The barbecue grill with a rotating fire receptacle includes a fire receptacle for receiving wood, charcoal or other combustible materials, which rotates, drawing air through a plurality of air inlets, or vents, formed through a lower wall thereof, thus increasing the oxygen flow through the receptacle and both increasing the rate of combustion as well as providing an enhanced convective path for the heated combustion gases. The barbecue grill with a rotating fire receptacle includes a vertical rod having opposed lower and upper ends, a base secured to the lower end of the vertical rod, the fire receptacle, which is rotatably mounted on the vertical rod, and a vertical support rotatably mounted on the upper end of the vertical rod. The fire receptacle includes the lower wall and at least one sidewall. The fire receptacle has a central aperture and the plurality of air inlets, or vents, formed therethrough.

14 Claims, 7 Drawing Sheets

(56) References Cited

U.S. PATENT DOCUMENTS

| | | | |
|---|---|---|---|
| 5,983,882 A | 11/1999 | Ceravolo | |
| 5,994,672 A | 11/1999 | Mestnik | |
| 6,070,571 A * | 6/2000 | Bradbury | A47J 37/0772 |
| | | | 126/25 A |
| 6,564,793 B2 | 5/2003 | DeClue | |
| 6,776,084 B2 | 8/2004 | Wild | |
| 7,140,362 B1 | 11/2006 | Johnston | |
| 7,347,197 B2 * | 3/2008 | Hankinson | A47J 37/0772 |
| | | | 126/25 A |
| 7,802,566 B1 * | 9/2010 | Faught | A47J 33/00 |
| | | | 126/30 |
| 7,823,577 B1 | 11/2010 | Babjak | |
| 7,866,259 B2 | 1/2011 | Zaghloul et al. | |
| 2005/0081839 A1 | 4/2005 | Yoon | |
| 2008/0098902 A1 | 5/2008 | Mansfield et al. | |
| 2008/0168976 A1 * | 7/2008 | Simsack | A47J 33/00 |
| | | | 126/30 |
| 2011/0011387 A1 | 1/2011 | Sawaya | |
| 2012/0017884 A1 | 1/2012 | Van Den Hoff et al. | |
| 2014/0030401 A1 | 1/2014 | Cusack | |

\* cited by examiner

BARBECUE GRILL WITH ROTATING FIRE RECEPTACLE

CROSS-REFERENCE TO RELATED APPLICATION

This application is a continuation-in-part of U.S. patent application Ser. No. 13/924,850, filed on Jun. 24, 2013, which is hereby incorporated by reference in its entirety, and which further claims the benefit of U.S. Provisional Patent Application Ser. No. 61/663,564, filed on Jun. 23, 2012.

BACKGROUND OF THE INVENTION

1. Field of the Invention

The present invention relates to outdoor cooking devices, and more particularly to an outdoor barbecue grill with a rotating fire receptacle for receiving wood, charcoal or other combustible materials.

2. Description of the Related Art

Cooking with a barbecue grill is a popular method of preparing food, particularly in the summer months when the weather is conducive to outdoor activities. In a typical barbecue or outdoor grill, food is placed on a fixed grill surface which is mounted above a heat source, typically in the form of fire. In a standard grill, whether one uses charcoal, gas or the like as a combustion fuel, the heat source is fixed, thus potentially leading to not only uneven cooking of the food to be prepared, but also minimizing the potential of controlled convective currents to enhance cooking of the food, as well as to control the combustion rate of the charcoal, gas or the like.

Additionally, in a conventional grill where the food is at rest with respect to the combustibles, a "flare up" is likely to occur. Flare up occurs when fats and oils liquefy upon heating and are deposited on the heat source, causing these fats and oils to ignite. Upon ignition of these fats and oils, an area of increased combustion occurs, potentially charring the food disposed above on the grill. In the event of flare up, the cook must either partially extinguish the increased flames, or quickly move the food to a new area of the grill that is not currently flaring up. However, since more fats and oils usually drip into the new area, flare up will occur again, so that the cook must expend considerable energy in responding to the flare up to avoid burned food.

It would be desirable to have the charcoal, gas or the like combust evenly, as well as having the food arranged on the grill to be cooked evenly. Similarly, it would be desirable to be able to prevent the occurrence of flare up while, at the same time, maintaining even cooking of the food. It would be further desirable to be able to control the combustion rate of the combustion materials, as well as controlling the convective flow of the combustion products which, for the most part, provide the heat for cooking of the food. Thus, a barbecue grill with a rotating fire receptacle solving the aforementioned problems is desired.

SUMMARY OF THE INVENTION

The barbecue grill with a rotating fire receptacle includes a fire receptacle for receiving wood, charcoal or other combustible materials, which rotates, drawing air through vents formed through a lower wall of the receptacle, thus increasing the oxygen flow through the receptacle and both increasing the rate of combustion as well as providing an enhanced convective path for the heated combustion gases. The rotation of the fire receptacle beneath one or more cooking surfaces further allows for even cooking of the food. The barbecue grill with a rotating fire receptacle includes a vertical rod having opposed lower and upper ends, a base secured to the lower end of the vertical rod, the fire receptacle, which is rotatably mounted on the vertical rod, and a vertical support rotatably mounted on the upper end of the vertical rod. The base is adapted for supporting the vertical rod on a support surface, such as the ground or a patio, and preferably includes a plurality of legs.

The fire receptacle includes a lower wall, at least one sidewall and a removable fire pan spaced above the lower wall. The lower wall and the removable fire pan each have central apertures formed therethrough. A plurality of air inlets are formed through the removable fire pan and the at least one sidewall, such that the fire receptacle is rotatably mounted on the vertical rod such that a central portion of the vertical rod projects through the central apertures formed through the lower wall and the removable fire pan. The fire receptacle is sized and shaped to receive the combustible material. The vertical support is rotatably mounted on the upper end of the vertical rod and includes an elongated housing extending coaxially with the vertical rod. The elongated housing preferably has a plurality of slots and apertures formed therethrough for removably receiving and supporting cooking utensils at a variety of user-selectable heights from the fire receptacle. The cooking utensils may include grill trays, rotating baskets, skewers and the like.

Each grill tray has a front edge adapted for releasable insertion into one of the slots formed through the elongated housing of the vertical support such that the grill tray is removably supported above the fire receptacle. Each rotating basket is sized and contoured for removably receiving food items to be cooked. Each rotating basket has opposed first and second ends, with an engaging member projecting from the first end thereof and being removably received within one of the apertures formed through the elongated housing of the vertical support. A handle portion is mounted on the second end thereof for grasping and manually rotating the rotating basket. Each skewer similarly has opposed first and second ends, with the first end thereof being removably received within one of the apertures formed through the elongated housing of the vertical support. The second end thereof is adapted for gripping by the user. Multiple slots and apertures are preferably formed through the elongated housing, arranged axially, thus allowing the user to select a desired height above the fire receptacle for removable mounting of one or more of the cooking utensils.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
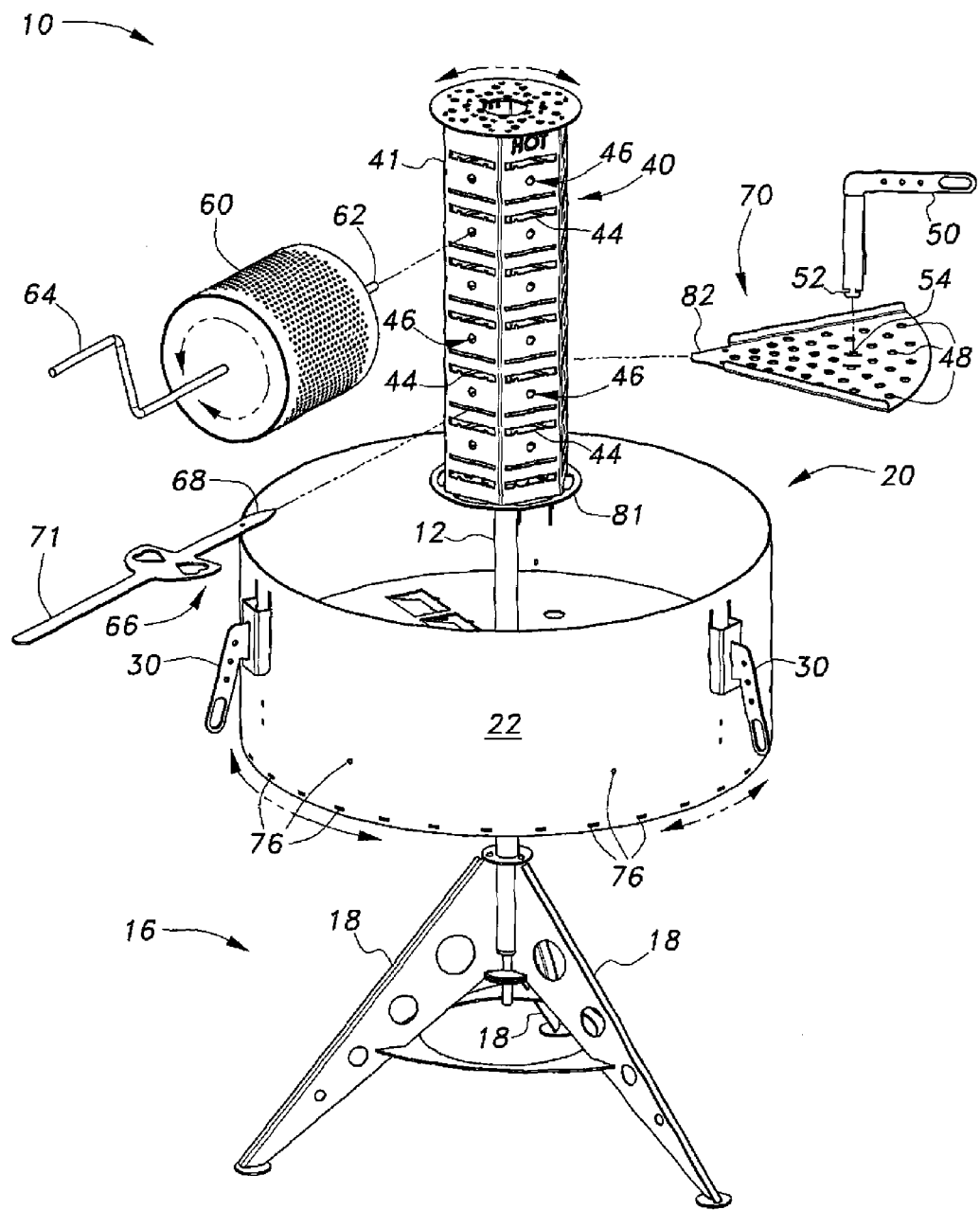
FIG. 1 is a partially exploded, perspective view of a barbecue grill with a rotating fire receptacle according to the present invention.
Figure 2:
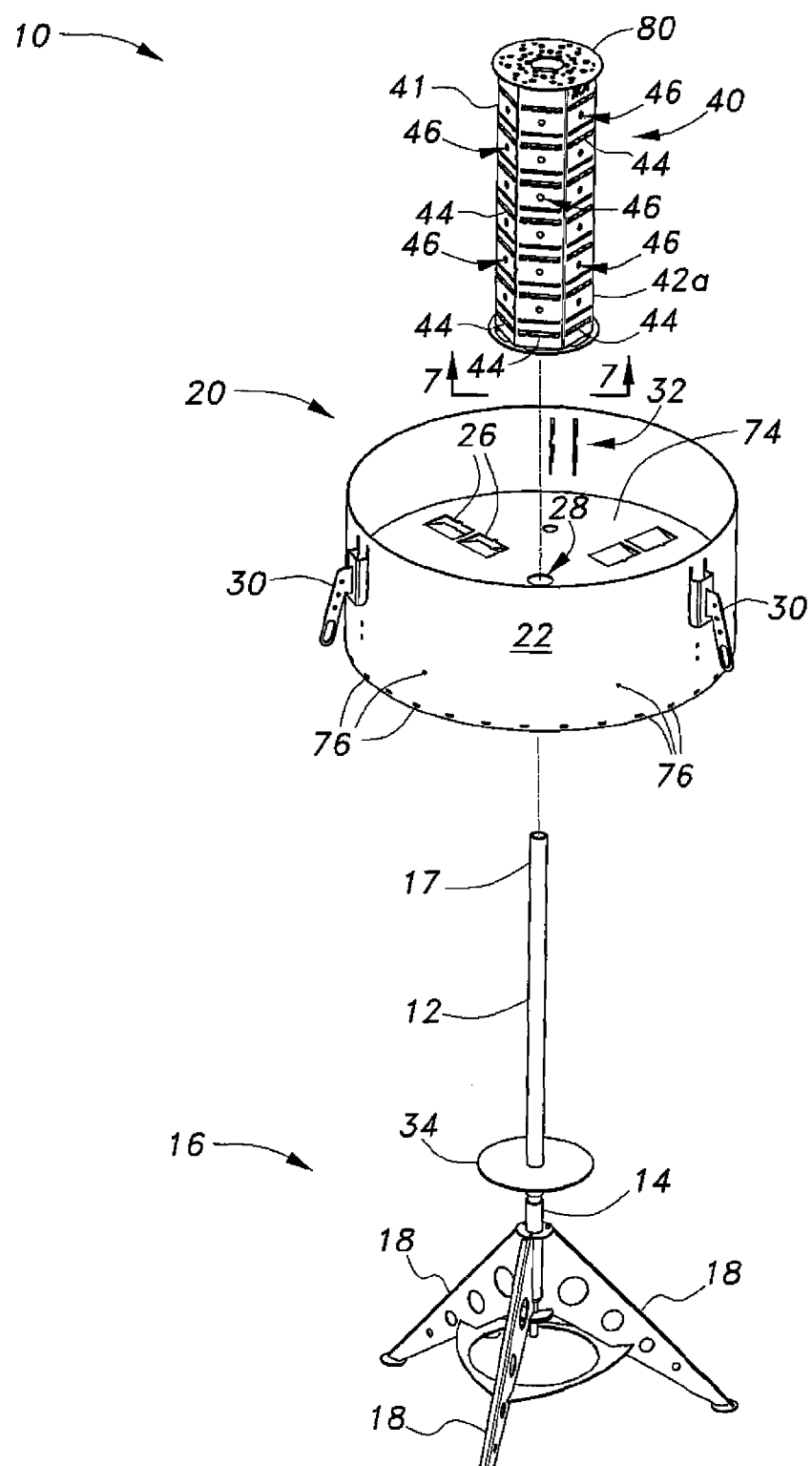
FIG. 2 is a partially exploded, perspective view of the barbecue grill with a rotating fire receptacle according to the present invention.

Referring now to FIGS. 1 and 2, the barbecue grill with a rotating fire receptacle 10 includes a fire receptacle 20 for receiving wood, charcoal or other combustible materials. The fire receptacle 20 is rotatable and includes vents 26 formed through a lower wall 24 of the receptacle 20 through which air may flow into the receptacle 20. Oxygen flow through the receptacle 20 increases the rate of combustion and provides an enhanced convective path for the heated combustion gases. The rotation of the fire receptacle 20 beneath one or more cooking surfaces (such as grill tray 70 in FIG. 1) further allows for even cooking of the food.

The barbecue grill with a rotating fire receptacle 10 includes a vertical rod 12 having opposed lower and upper ends 14, 17, respectively. A base 16 is secured to the lower end 14 of the vertical rod 12. The fire receptacle 20 and a vertical support 40 are rotatably mounted on the upper end 17 of the vertical rod 12. The base 16 is adapted for supporting the vertical rod 12 on a support surface, such as the ground or a patio, and preferably includes a plurality of legs 18. It should be understood that the number, design, contouring and relative dimensions of legs 18 are shown in the drawings for exemplary purposes only, and that any desired number, style or configuration of legs may be used. Further, it should be understood that lower end 14 of vertical rod 12 may be secured to base 16 by any suitable type of connector, such as through threaded engagement or the like. It should be understood that vertical rod 12 and base 16 may be made from any suitable material, such as, for example, steel, stainless steel, grade 304 stainless steel, aluminum, cast iron, a ceramic, a ceramic coated metal, porcelain or the like.

Figure 4:
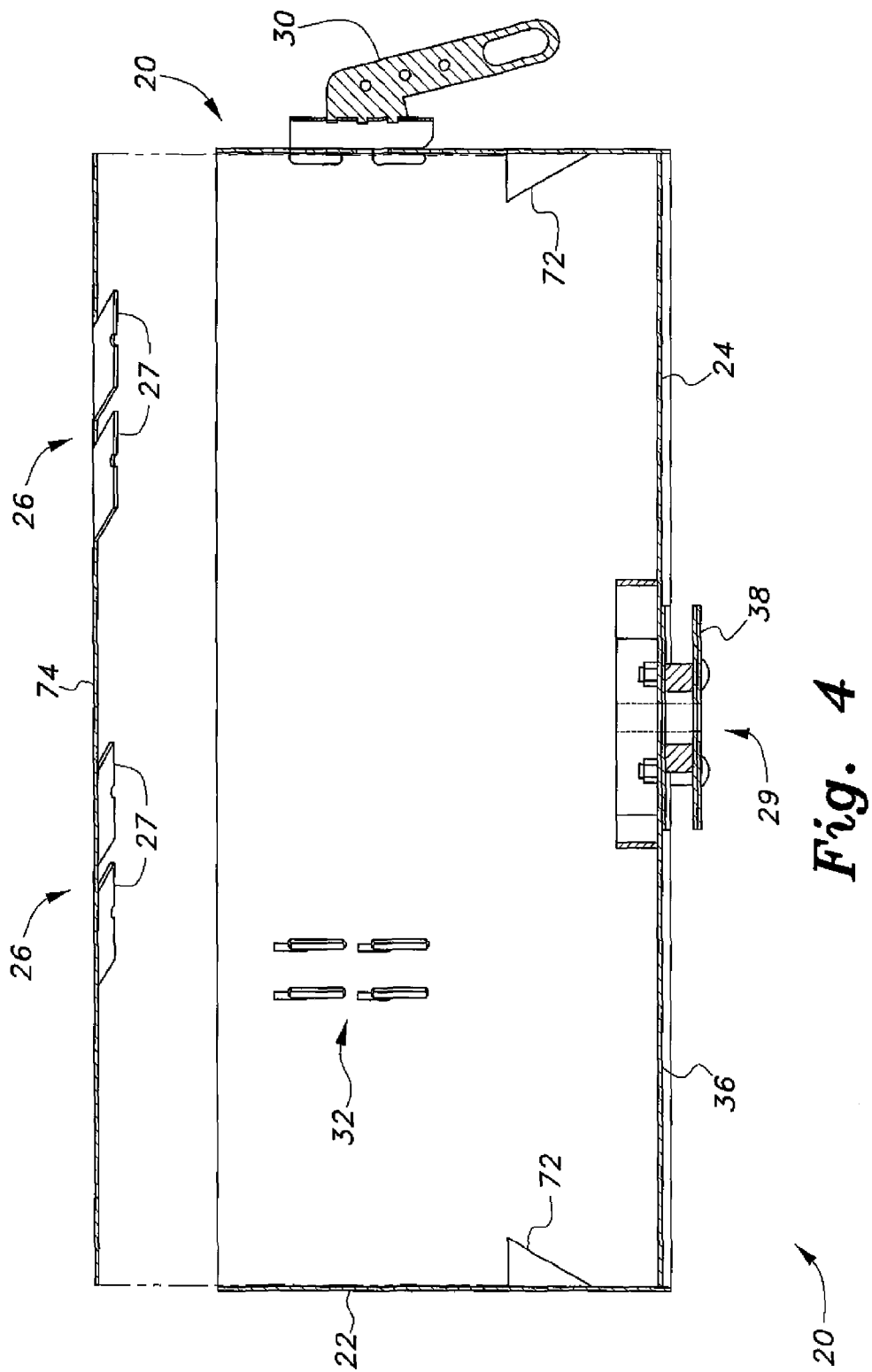
FIG. 4 is a side view in section of a fire receptacle of the barbecue grill with a rotating fire receptacle.

As shown in FIG. 4, the fire receptacle 20 includes a lower wall 24 and at least one sidewall 22 extending from the lower wall 22. Although shown in the drawings as having a substantially cylindrical contour, it should be understood that fire receptacle 20 may have any desired overall contouring and relative dimensions. Further, it should be understood that fire receptacle 20 may be made from any suitable material, such as steel, stainless steel, grade 304 stainless steel, aluminum, cast iron, a ceramic, a ceramic coated metal, porcelain or the like. It should be further understood that fire receptacle 20 may be rotatably mounted on vertical rod 12 in any suitable manner, such as by, for example, rotatable mounting of lower wall 24 on mounting plate 34. As shown in FIG. 4, a bearing assembly 38 may be mounted on a lower surface 36 of lower wall 24 for making rotatable contact with the mounting plate 34 (FIG. 2). Bearing assembly 38 may be any suitable type of bearing, such as a housing containing ball bearings or the like. As shown, bearing assembly 38 is preferably contained in a closed or sealed housing, thus preventing ash from the burning combustible material contained in fire receptacle 20 from entering the interior of the bearing assembly 38. Preferably, vertical rod 12 remains fixed with respect to base 16, thus the fire receptacle 20 rotates with respect to the fixed vertical rod 12.

As further shown in FIG. 4, internal supports 72 may be provided for positioning of a fire pan 74 above lower wall 24. The spacing of the combustible materials, which rest on top of the fire pan 74, from the lower wall 24 minimizes radiative or convective heating of the bearing assembly 38. In such a configuration, the lower wall 24 may serve as a receptacle surface for ash produced by the combustion materials, and is preferably separated from the fire pan 74 by a distance of approximately four inches.

A plurality of air inlets 26, or vents, are formed through fire pan 74. Each of the air inlets 26 may be further provided with suitable vanes 27 or other structures for assisting in directing air upwardly through the air inlets 26 when the fire receptacle 20 is rotated with respect to vertical rod 12, as best shown in FIG. 4. Additional openings 76 may be formed through sidewall 22, as shown, allowing for entry of air into the interior of fire receptacle 20. The openings 76 open into the chamber defined between lower wall 24 and fire pan 74. The air flow into the interior of fire receptacle 20, as discussed above, enhances the convective flow within the interior, thus enhancing the combustion rate of the combustible materials, as well as providing enhanced convective flow of the heated gases for cooking of the food.

The fire pan 74 has a central aperture 28 and a plurality of air inlets 26, or vents, formed therethrough. Each of the air inlets 26 may be further provided with suitable vanes or other structures for assisting in directing air upwardly through the air inlets 26 when the fire receptacle 20 is rotated with respect to vertical rod 12. The fire receptacle 20 is rotatably mounted on the vertical rod 12 such that a central portion of the vertical rod 12 projects through the central aperture 28, formed through the fire pan 74, and through a similar central aperture 29, formed through the lower wall 24.

The fire receptacle 20 is sized and shaped to receive the combustible material. In order to easily rotate the fire receptacle 20 without requiring the user to make direct contact with sidewall 22 or lower wall 24, one or more handles 30 may be provided, providing the user with an insulated gripping handle spaced apart from sidewall 22. Handles 30 may be releasably secured to sidewall 22 by releasable interconnection with one or more slots 32 formed through sidewall 22, as shown.

The vertical support 40 is rotatably mounted on the vertical rod 12, e.g., upper end 17 of vertical rod 12, and includes an elongated housing 41 extending coaxially with the vertical rod 12. It should be understood that vertical support 40 rotates separately from fire receptacle 20; i.e., the angular positioning of vertical support 40 with respect to vertical rod 12 is independent of the rotation of fire receptacle 20. As shown, the elongated housing 41 preferably has an outer frame 42a including a plurality of slots 44 and apertures 46 formed therethrough for removably receiving and supporting cooking utensils at a variety of user-selectable heights from the fire receptacle 20. The outer frame 42a can be hexagonal. The housing 41 may include therein an inner frame 42b having a configuration similar to that of outer frame 42a, including slots and apertures for receiving portions of the cooking utensils extending within the housing 41 through the outer frame 42a. The inner frame 42b within the housing 41 can thereby increase mounting stability of the cooking utensils.

Figure 7:
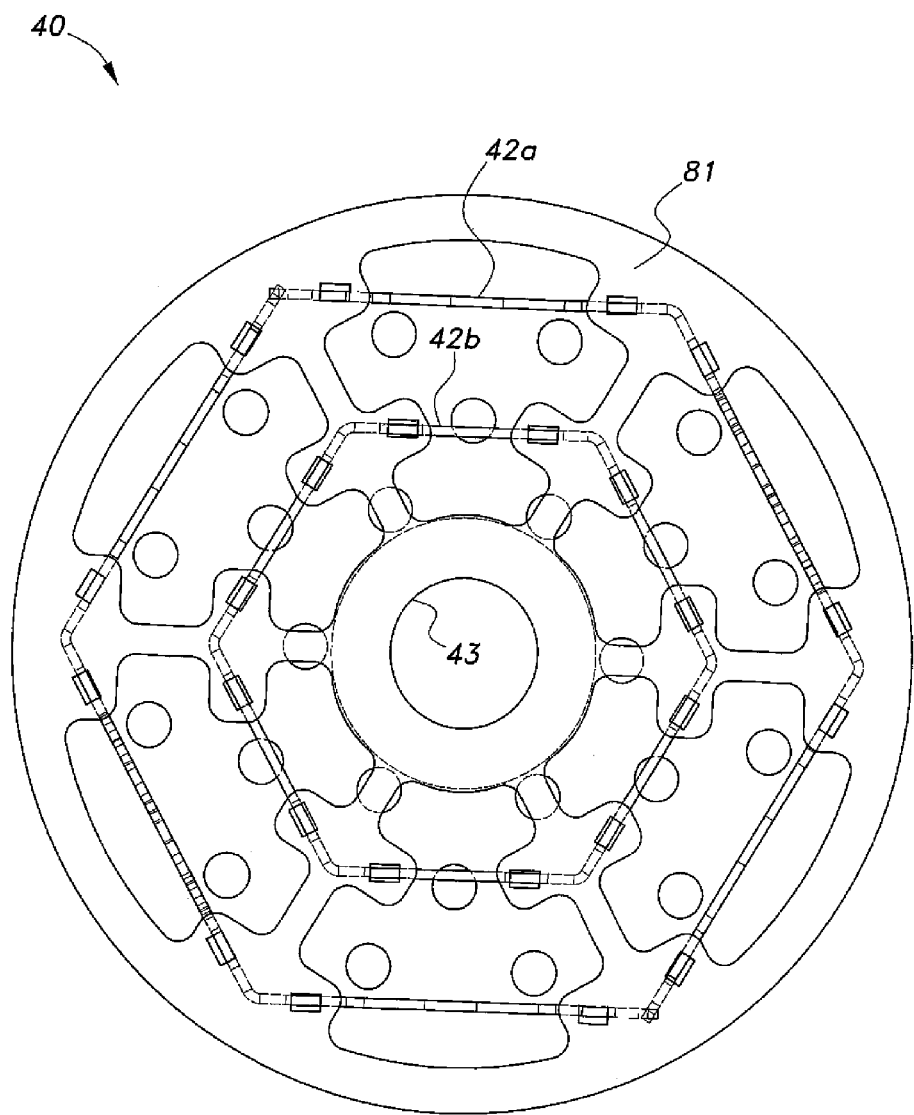
FIG. 7 is a bottom view of a vertical support of the barbecue grill with a rotating fire receptacle according to the present invention.

The cooking utensils may include grill trays 70, rotating baskets 60, skewers 66 and the like. As best seen in FIGS. 1 and 2, the housing 41 of vertical support 40 is shown as having a substantially hexagonal cross-sectional contour with a circular top plate 80 on top of housing 41. A similar lower circular mounting plate 81 may also be provided, as shown in FIG. 7. It should be understood that this configuration is shown for exemplary purposes only, and that vertical support 40 may have any desired overall contouring and relative dimensions. It should be further understood that vertical support 40 may be made from any suitable material, such as steel, stainless steel, grade 304 stainless steel, aluminum, cast iron, a ceramic, a ceramic coated metal, porcelain or the like. It should be understood that vertical support 40 may be mounted on the rod 12 by any suitable means. For example, rod 12 may be received, e.g., by sliding engagement, within an opening 43 defined through inner sleeve 42b of vertical support 40, as shown in FIG. 7.

Figure 3:
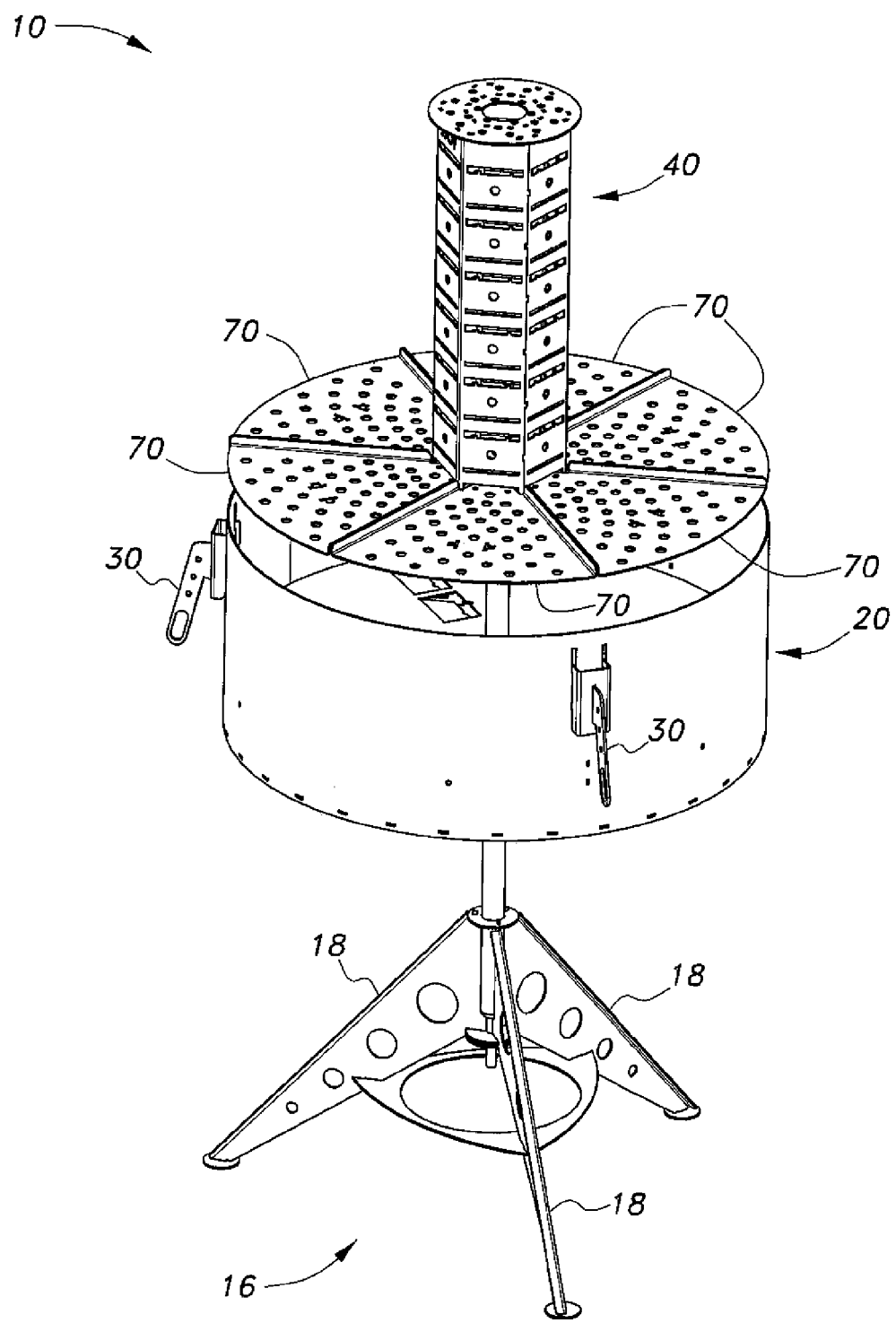
FIG. 3 is a perspective view of the barbecue grill with a rotating fire receptacle, shown with a plurality of grill trays arranged to form a planar cooking surface.

Each grill tray 70 has a front edge 82 adapted for releasable insertion into one of the slots 44 formed through the elongated housing 41 of the vertical support 40 such that the grill tray 70 is removably supported above the fire receptacle 20. As shown, each grill tray 70 preferably has perforations 48 or other openings formed therethrough, similar to a conventional barbecue or grilling surface, although it should be understood that solid and continuous grill trays may be used. Preferably, at least one slot 54 is formed through each grill tray 70, allowing for the releasable interconnection of a handle portion 50. As shown, each handle portion 50 is provided with an engaging end 52 for releasable insertion within the slot 54. Although shown as having a substantially triangular contour, it should be understood that grill trays 70 may have any desired contouring. In the example of FIG. 3, six such triangular grill trays 70 are mounted on hexagonal vertical support 40, each at the same height from fire receptacle 20, thus forming a level cooking surface, similar to that of a conventional barbecue grill.

As shown in FIG. 1, each rotating basket 60 is sized and contoured for removably receiving food items to be cooked above fire receptacle 20. Each rotating basket 60 has opposed first and second ends 62, 64, respectively, with an engaging member projecting from the first end 62 and being removably received within one of the apertures 46 formed through the elongated housing 41 of the vertical support 40. A handle portion is mounted on the second end 64 for grasping and manually rotating the rotating basket 60. Each skewer 66 similarly has opposed first and second ends 68, 71, with the first end 68 being removably received within one of the apertures 46 formed through the elongated housing 41 of the vertical support 40. The second end 71 is adapted for gripping by the user. Multiple slots 44 and apertures 46 are preferably formed through the elongated housing 41, arranged axially, thus allowing the user to select a desired height above the fire receptacle 20 for removable mounting of one or more of the cooking utensils. Although only a single rotating basket 60, a single grill tray 70 and a single skewer 66 are shown in FIG. 1, it should be understood that any suitable number of utensils may be provided, and that FIG. 1 is provided for exemplary and illustrative purposes only. Further, as noted above, any suitable type of utensil may be used in combination with, and be supported by, elongated housing 41 of vertical support 40.

Figure 5:
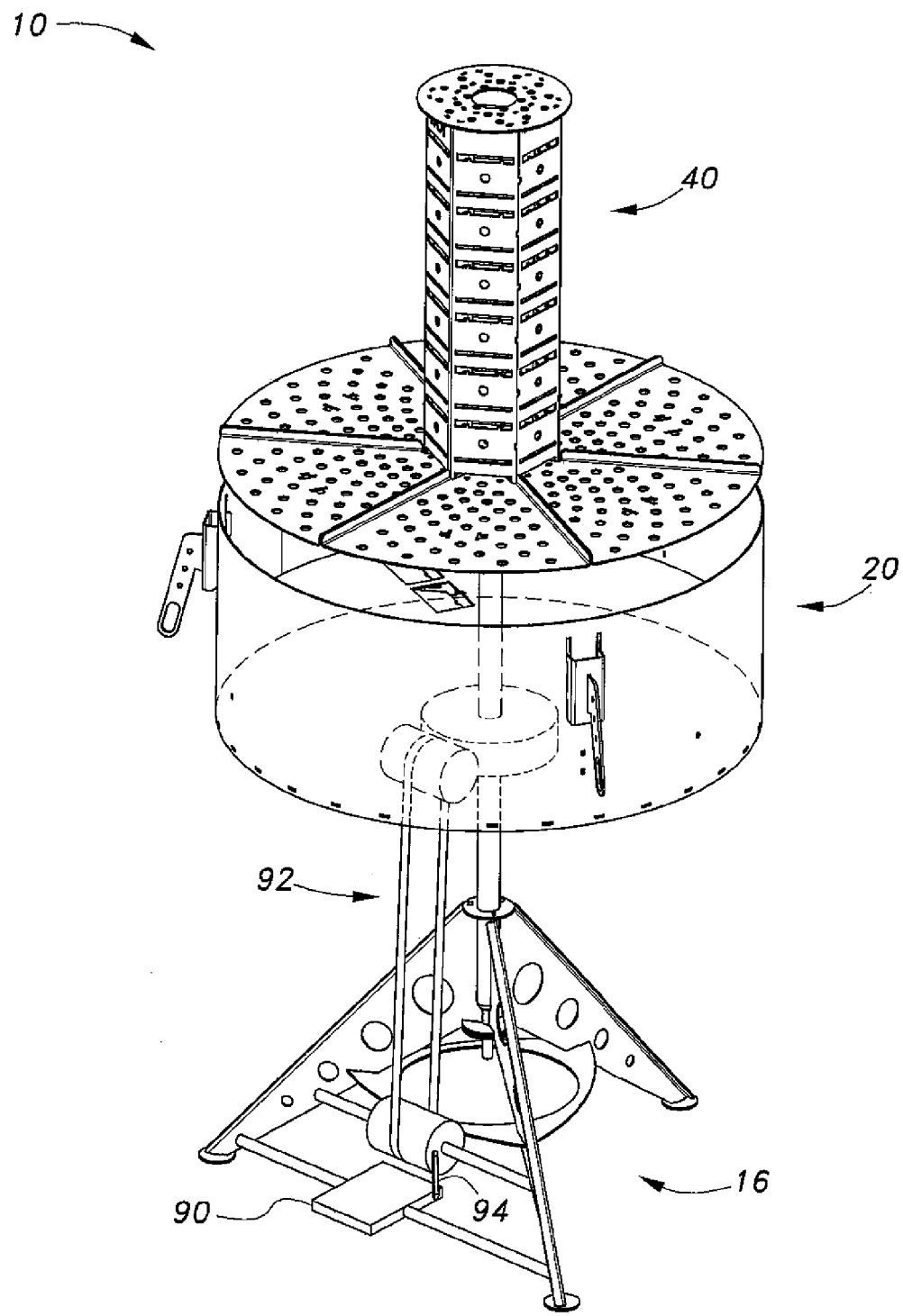
FIG. 5 is a perspective view of an alternative embodiment of the barbecue grill with a rotating fire receptacle.
Figure 6:
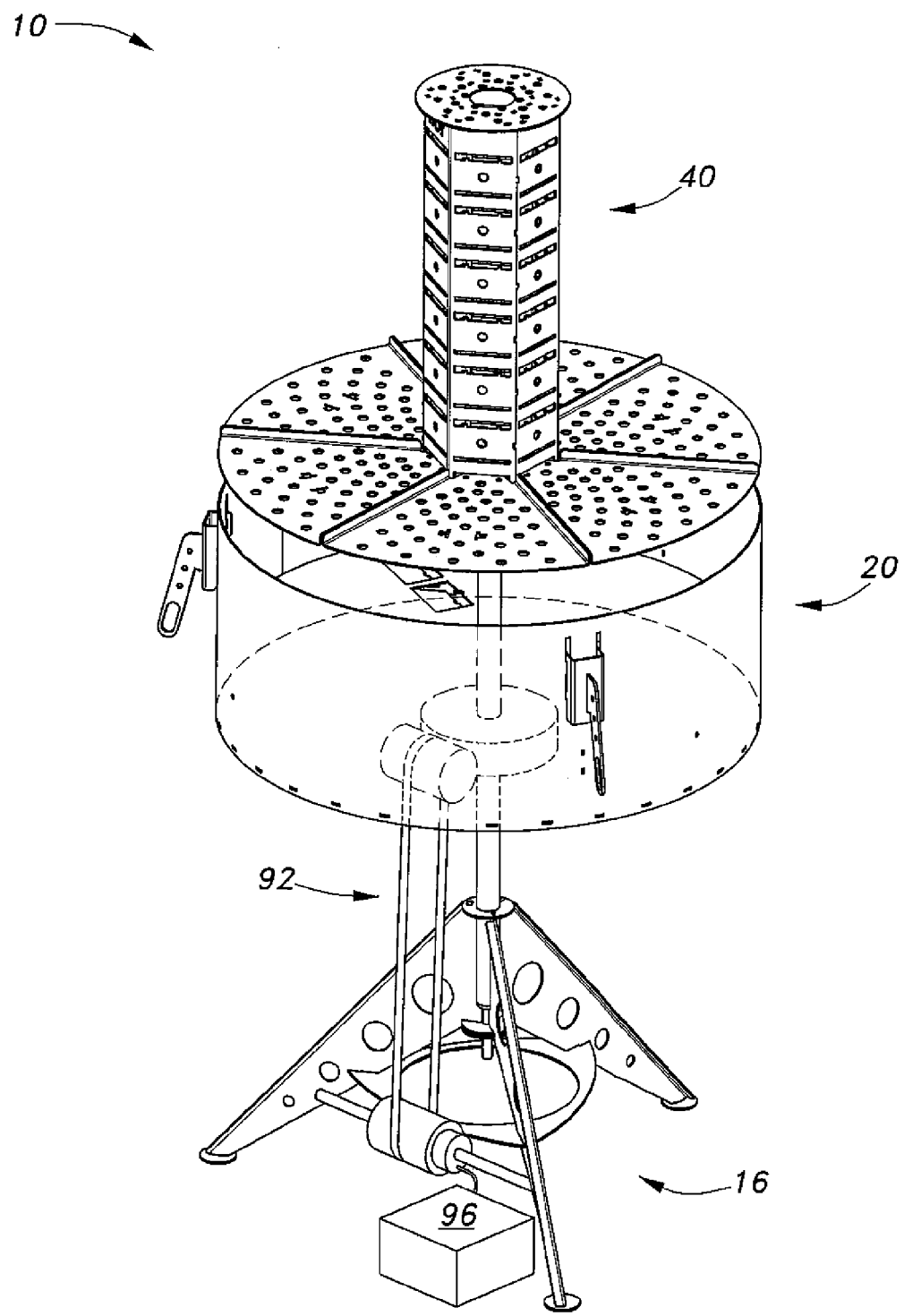
FIG. 6 is a perspective view of another alternative embodiment of the barbecue grill with a rotating fire receptacle.

It should be understood that any suitable form of motive power may be utilized to drive rotation of the fire receptacle 20 with respect to vertical rod 12, such as the use of handles 30 to manually rotate the fire receptacle 20. Alternatively, as shown in FIG. 5, a pedal-drive system may be utilized, with foot pedal 90 driving rotation of pulley assembly 92 via interconnection through rod or level 94. The pulley assembly 92 drives a gear train to generate rotation of fire receptacle 20. In the further alternative, a powered motor 96 replaces foot pedal 90 to drive rotation of pulley assembly 92. It should be understood that any suitable type of drive system may be utilized to drive rotation of fire receptacle 20, such as a Stirling engine powered by the heat of combustion or the like.

It is to be understood that the present invention is not limited to the embodiments described above, but encompasses any and all embodiments within the scope of the following claims.

I claim:

1. A barbecue grill with a freely rotating fire receptacle, comprising:
   a vertical rod having opposed lower and upper ends;
   a base secured to the lower end of said vertical rod, the base being adapted for supporting the vertical rod on a support surface;
   a fire receptacle having a lower wall, at least one sidewall and a removable fire pan spaced above the lower wall, a central aperture formed through the lower wall and the removable fire pan, a plurality of air inlets formed through the removable fire pan and the at least one sidewall, wherein the entire fire receptacle is freely rotatably mounted on said vertical rod such that a central portion of said vertical rod projects through the central apertures formed through the lower wall and the removable fire pan, whereby said fire receptacle is adapted for receiving a combustible material; and
   a vertical support rotatably mounted on the upper end of the vertical rod, said vertical support having an elongated housing extending coaxially with said vertical rod, the elongated housing having a plurality of openings formed about the housing and extending from the top of the housing to the bottom of the housing, wherein the plurality of openings comprise a repetitive series of three distinctly shaped, vertically aligned openings, further wherein the three distinct openings include at least one aperture, a first slot, and a second slot being sized and configured to be larger than the first slot.

2. The barbecue grill with a rotating fire receptacle as recited in claim 1, further comprising at least one bearing secured to a bottom surface of the lower wall of said fire receptacle.

3. The barbecue grill with a rotating fire receptacle as recited in claim 1, wherein said fire receptacle has a substantially cylindrical contour.

4. The barbecue grill with a rotating fire receptacle as recited in claim 1, further comprising at least one gripping handle secured to an exterior face of the at least one sidewall of said fire receptacle.

5. The barbecue grill with a rotating fire receptacle as recited in claim 1, further comprising a mounting plate secured to said vertical rod, the lower wall of said fire receptacle being rotatably supported on the mounting plate.

6. The barbecue grill with a rotating fire receptacle as recited in claim 1, further comprising at least one grill tray having a front edge releasably inserted in said first slot formed through the elongated housing of said vertical support such that said at least one grill tray is removably supported above said fire receptacle.

7. The barbecue grill with a rotating fire receptacle as recited in claim 6, wherein said at least one grill tray has perforations formed therethrough.

8. The barbecue grill with a rotating fire receptacle as recited in claim 6, further comprising at least one handle connected to said at least one grill tray.

9. The barbecue grill with a rotating fire receptacle as recited in claim 8, wherein the at least one handle is releasably connected to said at least one grill tray.

10. The barbecue grill with a rotating fire receptacle as recited in claim 1, further comprising at least one rotating basket for removably receiving food items, the at least one rotating basket having opposed first and second ends, an engaging member projecting from the first end of the at least one rotating basket, the engaging member being removably received within said at least one aperture formed through the elongated housing of said vertical support.

11. The barbecue grill with a rotating fire receptacle as recited in claim 10, wherein the at least one rotating basket further comprises a handle portion mounted on the second end thereof.

12. The barbecue grill with a rotating fire receptacle as recited in claim 1, further comprising at least one skewer having opposed first and second ends, the first end thereof being removably received within said first slot formed through the elongated housing of said vertical support, the second end thereof being adapted for gripping by a user.

13. The barbecue grill with a rotating fire receptacle as recited in claim 1, wherein said base comprises a plurality of legs.

14. The barbecue grill with a rotating fire receptacle as recited in claim 1, wherein said elongated housing has a hexagonal cross sectional contour.

\* \* \* \* \*